US010977290B2

(12) United States Patent
Miranda et al.

(10) Patent No.: US 10,977,290 B2
(45) Date of Patent: Apr. 13, 2021

(54) TRANSACTION CATEGORIZATION SYSTEM

(71) Applicant: Accenture Global Solutions Limited, Dublin (IE)

(72) Inventors: Abhilash Alexander Miranda, Dublin (IE); Konstantinos Mammas, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 274 days.

(21) Appl. No.: 15/964,892

(22) Filed: Apr. 27, 2018

(65) Prior Publication Data

US 2019/0228101 A1 Jul. 25, 2019

Related U.S. Application Data

(60) Provisional application No. 62/619,687, filed on Jan. 19, 2018.

(51) Int. Cl.
*G06F 16/35* (2019.01)
*G06N 5/02* (2006.01)
(Continued)

(52) U.S. Cl.
CPC .......... *G06F 16/353* (2019.01); *G06N 5/02* (2013.01); *G06N 20/00* (2019.01); *G06Q 10/06* (2013.01)

(58) Field of Classification Search
CPC .................................................. G06F 16/353
See application file for complete search history.

(56) References Cited

U.S. PATENT DOCUMENTS 6,751,600 B1    6/2004  Wolin
6,792,422 B1 *  9/2004  Stride ................... G06Q 40/00
                                                    705/35
(Continued)

OTHER PUBLICATIONS

Extended Search Report issued in European Patent Application No. 19152131.9 dated Mar. 6, 2019, 8 pages.

*Primary Examiner* — Kris E Mackes
(74) *Attorney, Agent, or Firm* — Brinks Gilson & Lione

(57) ABSTRACT

A method for processing digital transactions includes receiving, from one or more source systems, a plurality of uncategorized digital transactions; and prioritizing the uncategorized digital transactions according to a key performance indicator (KPI) of each uncategorized digital transaction. A subset of the prioritized uncategorized digital transactions is communicated to a labeling system configured to apply a category label to each digital transaction. A subset of categorized digital transactions corresponding to the subset of the prioritized uncategorized digital transactions is received from the labeling system. Category label and a label confidence value are applied to each transaction of a remaining set of uncategorized digital transactions based on the subset of categorized digital transactions. The label confidence value is indicative of a confidence that a given label was correctly applied to a given transaction. For each categorized digital transaction having a label confidence value at or above a predetermined threshold, the categorized digital transaction are communicated to a target system. For each remaining transaction, the transaction are considered as an uncategorized digital transaction and the steps above are repeated.

17 Claims, 4 Drawing Sheets

(51) Int. Cl.
*G06N 20/00* (2019.01)
*G06Q 10/06* (2012.01)

(56) References Cited

U.S. PATENT DOCUMENTS

| | | | |
|---|---|---|---|
| 8,095,436 B1 * | 1/2012 | Shah | G06Q 40/12 705/30 |
| 9,514,414 B1 | 12/2016 | Rosswog et al. | |
| 10,354,336 B1 * | 7/2019 | Izrailevsky | G06Q 40/12 |
| 2003/0028564 A1 | 2/2003 | Sanfilippo | |
| 2005/0273430 A1 * | 12/2005 | Pliha | G06Q 20/1085 705/42 |
| 2009/0222365 A1 | 9/2009 | McGlynn et al. | |
| 2013/0253965 A1 * | 9/2013 | Joseph | G06Q 20/4016 705/5 |
| 2016/0104252 A1 | 4/2016 | Simpson et al. | |

* cited by examiner

TRANSACTION CATEGORIZATION SYSTEM

RELATED APPLICATIONS

This application claims the benefit of priority under 35 U.S.C. § 119 to U.S. Provisional Patent Application No. 62/619,687, filed Jan. 19, 2018, which is incorporated by reference in its entirety.

BACKGROUND

Field

This application generally relates to transaction processing. In particular, this application describes a transaction categorization system.

Description of Related Art

The volumes of digital information being created and stored by manual, semi-manual and/or automated computer processes and logic is ever increasing. Identification of transactions within such digital information can be quite challenging. Variations and variability in such digital information greatly increases the complexity of performance of any form of automated transaction processing. In addition, management of such digital information, such as by organizing or characterizing the digital information and/or transactions, can be quite complex not only due to the sheer volume of the digital information, but also due to the variability and multifaceted characteristics of such information. Accordingly, systems and methods are needed to identify and manage such transactional activities contained with digital information.

SUMMARY

In a first aspect, a system for processing digital transactions includes an input/output (I/O) interface for receiving uncategorized digital transactions from one or more source systems and for communicating categorized digital transactions to one or more target systems, a processor in communication with the I/O interface; and non-transitory computer readable media in communication with the processor. The non-transitory computer readable media stores instruction code, which when executed by the processor, causes the processor to receive, from one or more source systems, a plurality of uncategorized digital transactions. The processor prioritizes the uncategorized digital transactions according to a key performance indicator (KPI) of each uncategorized digital transaction. The processor then communicates a subset of the prioritized uncategorized digital transactions to a labeling system configured to apply a category label to each digital transactions and receives, from the labeling system, a complete set or subset of categorized digital transactions corresponding to the subset of the prioritized uncategorized digital transactions. The processor then applies a category label and a label confidence value to each transaction of a remaining set of uncategorized digital transactions based on the subset of categorized digital transactions. The label confidence value is indicative of a confidence that a given label was correctly applied to a given transaction. For each categorized digital transaction having a label confidence value at or above a predetermined threshold, the processor communicates the categorized digital transaction to a target system. For each remaining transaction, the processor considers the transaction as an uncategorized digital transaction and repeat the steps above.

In a second aspect, a non-transitory computer readable media that stores instruction code for processing digital transactions is provided. The non-transitory computer readable media stores instruction code that cause a machine to receive, from one or more source systems, a plurality of uncategorized digital transactions. The machine then prioritizes the uncategorized digital transactions according to a key performance indicator (KPI) of each uncategorized digital transaction, and communicates a subset of the prioritized uncategorized digital transactions to a labeling system configured to apply a category label to each digital transaction. The machine receives, from the labeling system, a subset of categorized digital transactions corresponding to the subset of the prioritized uncategorized digital transactions. The machine applies a category label and a label confidence value to each transaction of a remaining set of uncategorized digital transactions based on the subset of categorized digital transactions. The label confidence value is indicative of a confidence that a given label was correctly applied to a given transaction. For each categorized digital transaction having a label confidence value at or above a predetermined threshold, the machine communicates the categorized digital transaction to a target system. For each remaining transaction, the machine considers the transaction as an uncategorized digital transaction and repeats the steps above.

In a third aspect, a method for processing digital transactions includes receiving, from one or more source systems, a plurality of uncategorized digital transactions; and prioritizing the uncategorized digital transactions according to a key performance indicator (KPI) of each uncategorized digital transaction. The method includes communicating a subset of the prioritized uncategorized digital transactions to a labeling system configured to apply a category label to each digital transactions, and receiving, from the labeling system, a subset of categorized digital transactions corresponding to the subset of the prioritized uncategorized digital transactions. The method includes applying a category label and a label confidence value to each transaction of a remaining set of uncategorized digital transactions based on the subset of categorized digital transactions. The label confidence value is indicative of a confidence that a given label was correctly applied to a given transaction. For each categorized digital transaction having a label confidence value at or above a predetermined threshold, the method includes communicating the categorized digital transaction to a target system. For each remaining transaction, the method includes considering the transaction as an uncategorized digital transaction and repeating the steps above.

DETAILED DESCRIPTION

The embodiments described below overcome the problems described above by providing a transaction categorization system capable of processing large volumes of transactional data in the form of log entries. The system performs automated prioritization of large text datasets using a sequence of techniques that may include adaptive statistical techniques involving filtering-sampling, dimensionality reduction, clustering, and representative sampling. Within the system, labeling of automatically prioritized text included in the transaction entries may be performed using expert systems. The labeling of text samples may represent clusters of transaction entries and outlier transaction entries. Efficient automated labeling of large text datasets may be performed by the system using closed-loop iterative statistical classification built on labeling of automatically prioritized text.

Figure 1:
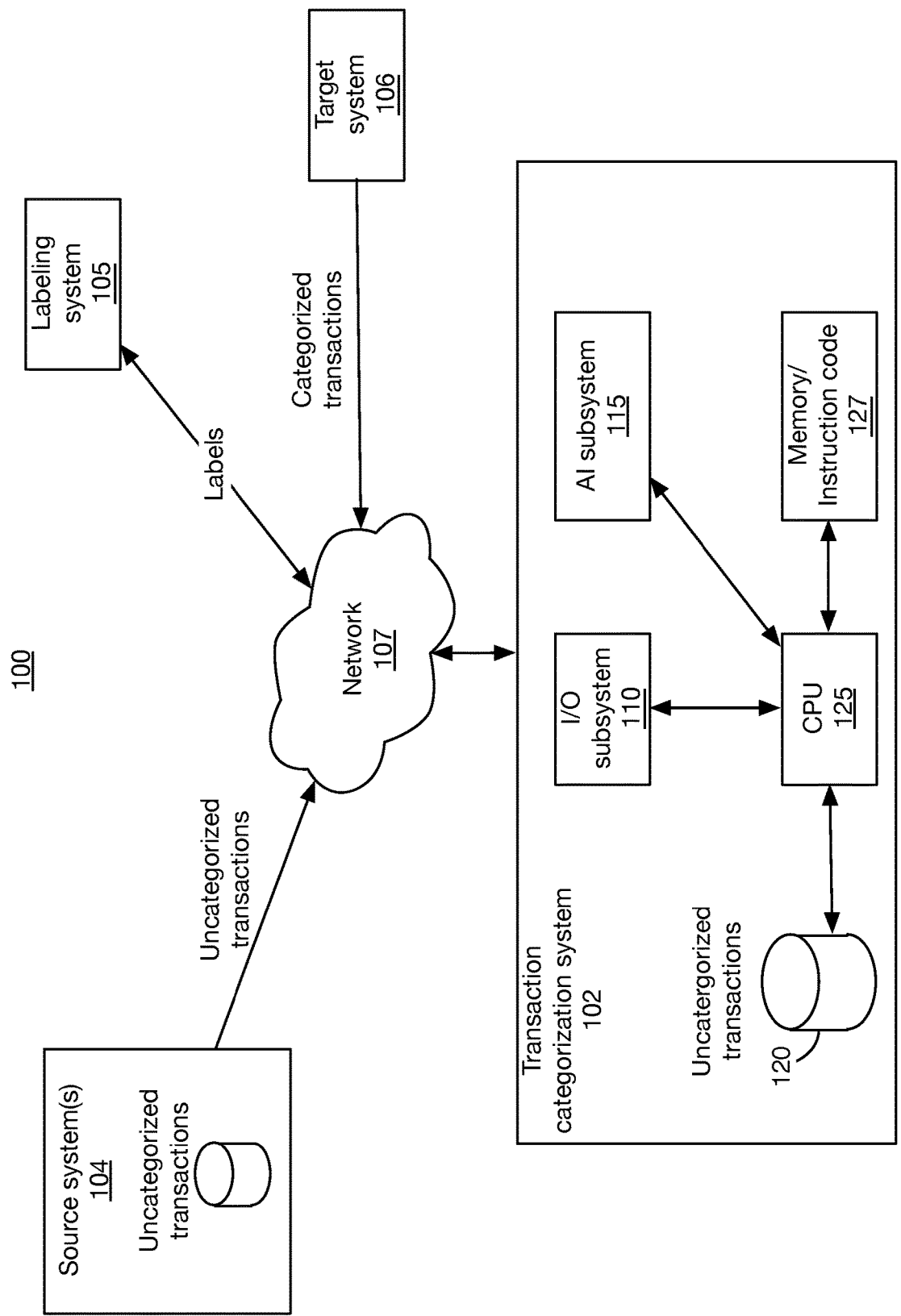
FIG. 1 illustrates an exemplary environment that includes a transaction categorization system.

FIG. 1 illustrates an exemplary environment 100 that includes various systems/devices that facilitate categorizing transactions. Exemplary systems/devices of the environment 100 include a transaction categorization system (TCS) 102, a source system 104, labeling system 105, and a target system 106. The transaction categorization system 102, source system 104, labeling system 105, and target system 106 may communicate with one another via a network 107, such as the Internet.

The various systems may correspond to computer systems such as an Intel®, AMD®, or PowerPC® based computer system or a different computer system and can include application specific computer systems. The computer systems may include an operating system, such as Microsoft Windows®, Linux, Unix® or other operating system. The terminals may be desktop PCs and/or mobile terminals.

The source system 104 may correspond to an enterprise system that manages any number of transactions. For example, in one implementation, the transactions may correspond to expense report transactions. The transactions may be stored within a database of the source 104. Exemplary records stored in the database are illustrated in Table 1 below.

TABLE 1

| Vendor | Description | Date | Amount |
|---|---|---|---|
| ABC Corp. | Computer equipment for employee A | Jan. 5, 2018 | $10,000 |
| Hospital A | Health screening for employee A | Jan. 6, 2018 | $5,000 |
| Airline X | Airline tickets for employee A | Feb. 1, 2018 | $450 |
| ABC Corp. | Computer equipment for employee B | Jan. 5, 2018 | $10,000 |
| Hospital A | Health screening for employee B | Jan. 6, 2018 | $5,000 |
| Airline X | Airline tickets for employee B | Feb. 1, 2018 | $450 |
| ... | ... | ... | ... |

Referring to Table 1, each record may identify a vendor, a description of a service provided by the vendor, a date the service was provided, and a cost associated with the service. As noted above, Table 1 is merely exemplary. For example, while a single description field is illustrated there may me additional descriptive fields and/or the descriptive fields may be the concatenation of many fields.

In other instances, the transactions could be different, such as security-related transactions, loan-related transactions, etc. In any case, each transaction may include a key performance indicator (KPI) used by the TCS 102 in performing various prioritization operations, as describe below. For example, for the transactions of Table 1, the KPIs may correspond to the amount values for each transaction. In transactions related to security logs, the KPIs may correspond to values for each transaction indicative of a security threat level associated with the transaction. Thus, the KPI is generally considered to be a key and/or may be one of the most important fields in the transaction record. In some cases, the Description field may be equally important.

To facilitate communicating the transactions to the TCS 102, the source system 104 may implement one or more APIs. For example, the source system 104 may be configured to communicate with the TCS 102 via an API such as a webserver API, a SOAP-based web service, a RESTful API, and/or a different type of API.

The labeling system 105 is configured to receive a subset of uncategorized transactions from the TCS 102 and determine a category for each transaction of the subset. In this regard, the labeling system 105 may use various machine learning techniques that may operate alone or in cooperation with a user of the labeling system 105 to assign categories to the transaction in the subset. In this regard, labeling system 105 may be configured to facilitate communicating information with the TCS 102 via one or more APIs of the enterprise system 102. For example, the labeling system 105 may be configured to communicate with the TCS 102 via an API such as a webserver API, a SOAP-based web service, a RESTful API, and/or a different type of API.

The target system 106 corresponds to any system configured to receive transactions that have been categorized. For example, the target system 106 may correspond to an enterprise planning and resource (ERP) system for an organization that ingest categorized transactions in performing operations such as reconciliation of bills, payment of invoices, etc. The target system 106 may be configured to facilitate communicating information with the TCS 102 via one or more APIs described above.

The TCS 102 may include a processor 125, input/output subsystem 110, and an AI subsystem 115. The TCS 102 may include other subsystems.

The I/O subsystem 110 of the TCS 102 is configured to facilitate communications with entities outside of the TCS 102. In this regard, the I/O subsystem 110 may be configured to dynamically determine the communication methodology utilized by entities of the environment 100 for communicating information to the entities using the determined communication methodology. For example, the I/O subsystem 110 may determine that a first entity utilizes a RESTful API and may, therefore, communicate with the entity using a RESTful communication methodology.

As described in more detail below, the I/O subsystem 110 may implement a web browser to facilitate generating one or more web-based interfaces through which users of source system 104, labeling system 105, target system 106, and/or other systems may interact with the TCS 102. The web browser may implement a web services interface to facilitate automating some of the web-based functionality via a computer. For example, one or more of the entities of the environment 100 may utilize the web services interfaces to access information stored by the TCS 102.

The AI subsystem 115 may correspond to hardware specifically configured to perform or assist in the performance of various natural language processing techniques such as, for example, latent Dirichlet allocation (LDA) to identify topics associated with transactions, hierarchical density based cluster analysis (H-DBSCAN) to group transaction under one or more topics, Knuth-Morris-Pratt string searching to locate and extract occurrences of a certain words within a transaction, possibly linear clustering algorithms to mine text data, and/or other techniques. As described in more detail below, these operations facilitate generating a corpus of terms located within all transactions, generating topics associated with the corpus, clustering of transactions under one or more topics, etc. Other natural language and/or machine learning techniques may be utilized to locate personal data.

The CPU 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O subsystem 110, AI subsystem 115, and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 2:
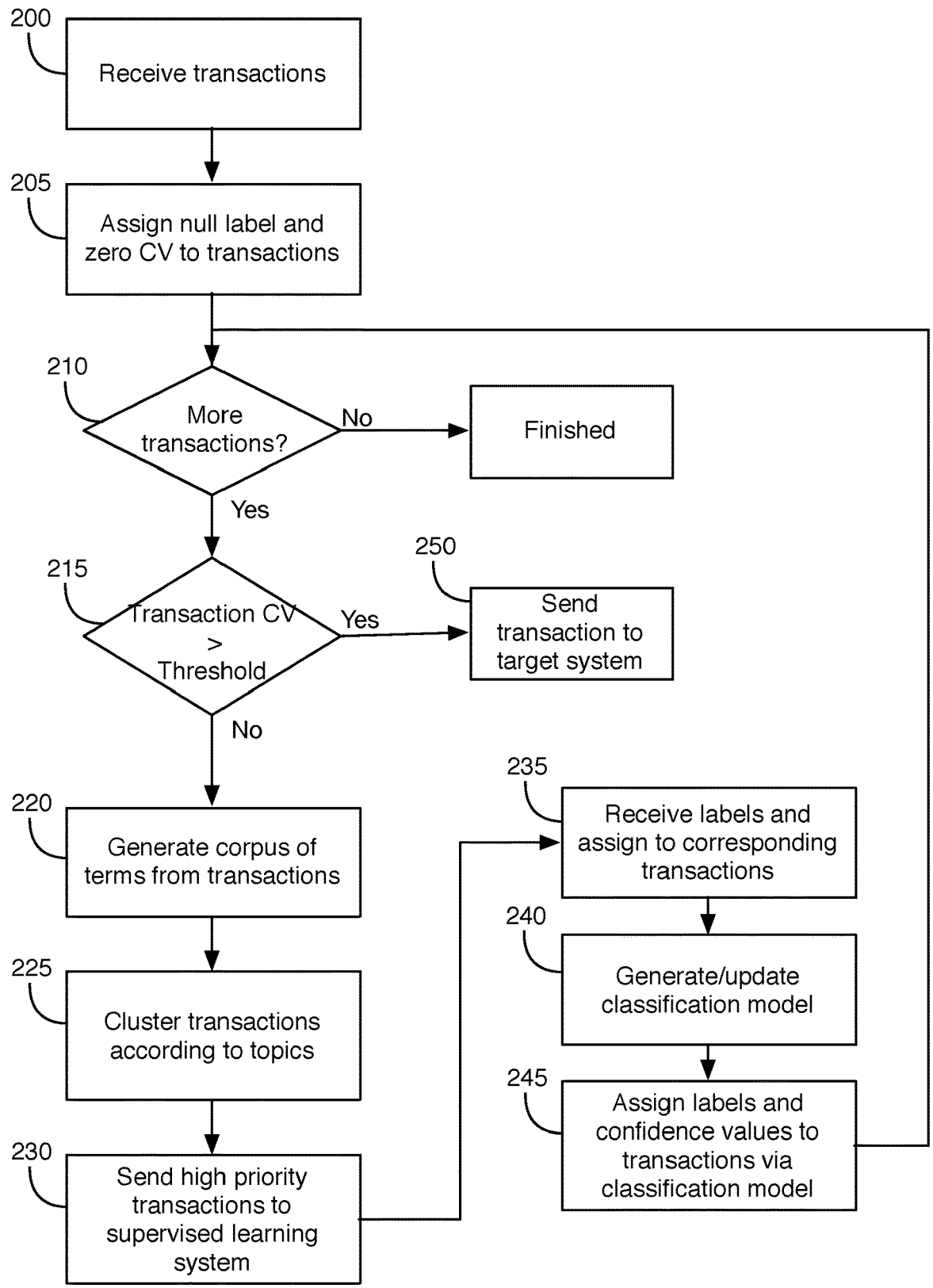
FIG. 2 illustrates exemplary operations performed by the transaction categorization system.

Exemplary operations performed by the CPU 125 and/or other modules of the TCS (102) in categorizing transactions are illustrated in FIG. 2. In this regard, the operations may be implemented via instruction code stored in non-transitory computer readable media 127 that resides within the subsystems configured to cause the respective subsystems to perform the operations illustrated in the figures and discussed herein.

Referring to FIG. 2, at operation 200, the TCS 102 may receive uncategorized transactions. For example, one or more source systems 104 may communicate, to the TCS 102, a group of transactions such as transactions related to various expenses, security-related transactions, application log transactions, or any other type of information that may be expressed in the form of records of transactions.

The transactions may include attributes or features such as descriptions, time-stamps, sequence numbers, source identifiers, etc. The transactions may take the form of alphanumeric structured and/or semi-structured and/or flat or hierarchical text originating from, for example, spread sheets, databases, log files, etc.

Uncategorized transactions received from source systems 104 may be stored to a database 120 of the TCS 102. For example, during an initial stage, 1,000,000 transactions may be stored in the database 120.

Post-processing operations may be performed on the uncategorized transactions stored in the database 120 to reduce the complexity of information stored in each transaction. For example, punctuation in fields of each transaction may be corrected or eliminated. Spell-checking and grammar-checking may be applied to correct any spelling and grammar issues. Phraseology of fields of transactions may be changed to remove redundancy. Connecting terms may be removed to reduce each transaction to nouns, adverbs, verbs, etc. Other processing operations may be performed.

At block 205, each transaction in the database 120 may be assigned a null or generic category label and a label confidence value indicative of a level of confidences that the label assigned to the transaction is correct, as illustrated in Table 2 below.

TABLE 2

| Vendor | Description | Date | Amount | Category | CV |
|---|---|---|---|---|---|
| ABC Corp. | Computer equipment for employee A | Jan. 5, 2018 | $10,000 | NULL | 0 |
| Hospital A | Health screening for employee A | Jan. 6, 2018 | $5,000 | NULL | 0 |
| Airline X | Airline tickets for employee A | Feb. 1, 2018 | $450 | NULL | 0 |
| ABC Corp. | Computer equipment for employee B | Jan. 5, 2018 | $10,000 | NULL | 0 |
| Hospital A | Health screening for employee B | Jan. 6, 2018 | $5,000 | NULL | 0 |
| Airline X | Airline tickets for employee B | Feb. 1, 2018 | $450 | NULL | 0 |
| ... | ... | ... | ... | ... | ... |

Referring to Table 2, the initial category may be set to the term "NULL" and the label confidence value may be set to 0 to indicate a zero level of confidence that the currently assigned category is correct.

At operation 210, the CPU 125 of the TCS 102 may determine whether there are any transactions remaining in the database 120 to be transferred to the target system 106.

If at operation 210, there are remaining transactions, then at operation 215, the CPU 125 of the TCS 102 may communicate transactions having CV value above a predetermined threshold to the target system 106. For example, the threshold may be 0.8 (80%) so that any transactions having a label confidence value above 80% are communicated to the target system 250 and removed from the database 120. The remaining transactions (i.e., those with CVs below the threshold) are processed in subsequent operations.

As noted above, the CV value for each transaction is initially set to a level that is below the threshold. Therefore, during an initial pass, all the transactions may be processed in the operations below.

At block 220, a corpus of terms associated with all or a subset of the transactions may be determined by the CPU 125 alone and/or in cooperation with the AI subsystem 115. A corpus matrix such as a so-called matrix bag of words or pseudo-words may be generated. The bag of pseudo-words is a sequence of two or more words. Sometimes this is referred to as n-gram vectorization where up to n sequence of words are used to build the bag of (pseudo) words.

Each column of the matrix may correspond to a word found in one or more of the transactions. Each row of the matrix corresponds to a single transaction. Each value of the matrix may indicate whether the word associated with the column appears in the transaction associated with the row. For example, a value of zero may indicate that the word does not appear in the transaction and a non-zero value (e.g., one) may indicated that the work appears one or more times in the transaction. In some cases, the value may correspond to the number of occurrences of the word. The result of the matrix is a vector representation of each transaction where the vector space has N dimensions corresponding to the N different words found among all the transactions.

At operations 225, the transactions may be clustered under one or more topics. For example, CPU 125 alone and/or in cooperation with the AI subsystem 115 may perform latent Dirichlet allocation on the vectored transactions or a different procedure to identify one or more topics associated with the transactions.

Next, the transactions may be associated with the different topics via, for example, hierarchical density based clustering (H-DBSCAN) or a different unsupervised learning procedure. The result of the clustering may be a matrix with columns corresponding to each of the topics row corresponding to each of the transactions. Each value of the matrix may indicate whether a corresponding topic is associated with a corresponding transaction. For example, a value of zero may indicate that the topic is unrelated. A value of 0.5 may indicate that there is a 50% probability that the transaction is related to the topic, etc. High values may indicate higher probabilities that a transaction is related to a given topic.

Figure 3:
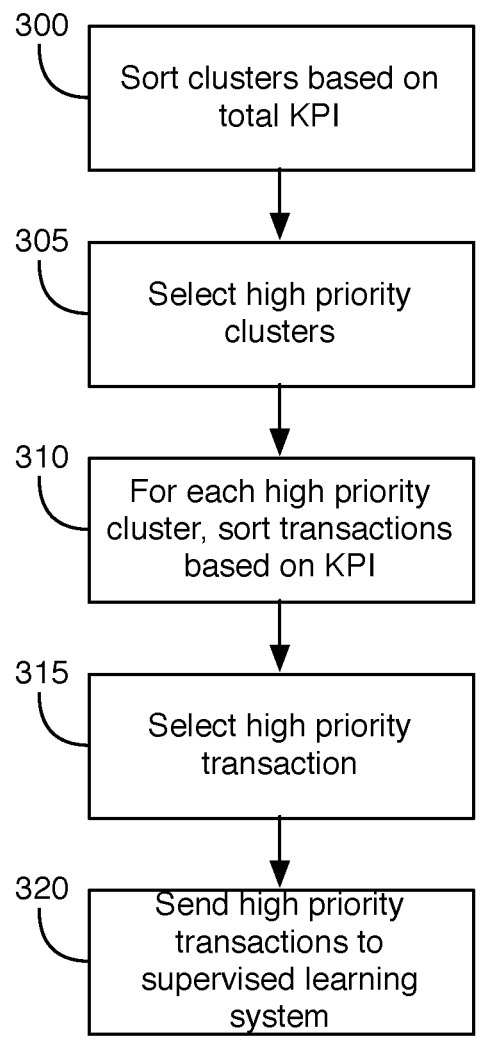
FIG. 3 illustrates exemplary operations performed by the transaction categorization system in prioritizing transactions.

At operation 230, the transactions are prioritized and a number of highest priority transactions are communicated to the labeling system 105. FIG. 3 illustrates various operations that are performed to facilitate prioritization of the transactions.

Referring to FIG. 3, at operation 300, the clusters associated with the different topics are sorted to identify the most important/relevant clusters. In one implementation, the topics are sorted based on the total KPI value of all transactions falling within the topic. For example, if the transactions listed in Table 2 having the partial description "Computer equipment for employee" fell within the same topic, the total KPI would correspond to the sum of the dollar amounts specified in the amount columns of those transactions (i.e., $20,000).

At operation 305, the top N clusters of the sorted clusters are selected. For example, the top 100 clusters based on KPI may be selected.

At operation 310, the transactions associated with the top N clusters are sorted to identify the most important/relevant transactions. In one implementation, the transactions are sorted based on the KPI value of the transaction.

At operation 315, one or more of the sorted transactions having the highest KPI may be selected. Following the example above, if N=1, either transaction having the partial description "Computer equipment for employee" may be selected.

At operation 320, the selected transactions may be communicated to the labeling system. For example, one hundred prioritized transactions of the original 1,000,000 transactions stored in the database 120 may be communicated to the labeling system 105.

Returning to FIG. 2, at operation 235, the prioritized transactions are labeled by the labeling system 105 and returned to the TCS 102. For example, the labeling system 105 may implement various machine learning techniques, such as rules based techniques, which may be supervised by a user, to label the prioritized transactions.

At operation 240, a classification model such as a statistical decision tree, machine learning classifier, predictive model and/or deep learning model may be generated and/or updated based on the labeled prioritized transactions. Exemplary models include Random Forest, CHAID, or C4.5 or a statistical machine learning classifier such as the Logistic Regression or Support Vector Machine or Artificial Neural Network. The statistical decision tree or statistical classifier facilitates determining labels for uncategorized transactions and a label confidence value associated with the label. For example, the decision tree may correspond to a regression tree that facilitates predicting an outcome as a real number (e.g., the probability that a category label is correct).

At operation 245, the records in the database 120 associated with the transactions may be updated with the determined labels and CVs. The operations may repeat from operation 210. Table 3 below illustrates exemplary labels and CVs added to the records associated with the transactions in the database 120.

TABLE 3

| Vendor | Description | Date | Amount | Category | CV |
| --- | --- | --- | --- | --- | --- |
| ABC Corp. | Computer equipment for employee A | Jan. 5, 2018 | $10,000 | Capital Equipment | .9 |
| Hospital A | Health screening for employee A | Jan. 6, 2018 | $5,000 | Health Care | .5 |
| Airline X | Airline tickets for employee A | Feb. 1, 2018 | $450 | Travel | .8 |
| ABC Corp. | Computer equipment for employee B | Jan. 5, 2018 | $10,000 | Capital Equipment | .9 |
| Hospital A | Health screening for employee B | Jan. 6, 2018 | $5,000 | Health Care | .5 |
| Airline X | Airline tickets for employee B | Feb. 1, 2018 | $450 | Travel | .8 |
| ... | ... | ... | ... | ... | ... |

During a second pass, at operation 215, transactions having a CV higher than the predetermined threshold are communicated to the target system 106 and removed from the database 120. Those transactions having CVs lower than the predetermined threshold may be processed via subsequent operations. For example, where the threshold is set to 0.8, the transaction with the descriptions "Computer equipment for employee xyz" and "Airline tickets for employee xyz" may be communicated to the target system 106 and removed from the database 120. The transactions with the descriptions "Health screening for employee xyz" may be processed via subsequent operations.

With each iteration through the operations above, the number of transactions that require additional processing decreases. For example, of the 1,000,000 transactions that may have been initially stored in the database 120, 800,000 transactions may remain after the first iteration. This means that 200,000 transactions had a high probability of being automatically labeled correctly based on the comparatively few (e.g., one hundred) transactions that were prioritized and communicated to the labeling system at operation 320.

After a second iteration, 400,000 transactions may remain and so on until all the transactions have been categorized with a label. Thus the total number of transactions that require labeling by the labeling system 105 generally equates to the number of transactions communicated to the labeling system 105 at operation 230 times the number of iterations through the operations. For example, if the transactions were completely processed after five iterations, the total number of transaction that required labeling would be 500.

Accordingly, the operations above facilitate categorization of a large number of transactions based on a comparative fewer number of determined priority transactions. This advantageously results in reduced processing power to categorize each transaction individually while increasing the categorized digital transaction having a label confidence value at or above a predetermined threshold to be communicated to a target system.

Figure 4:
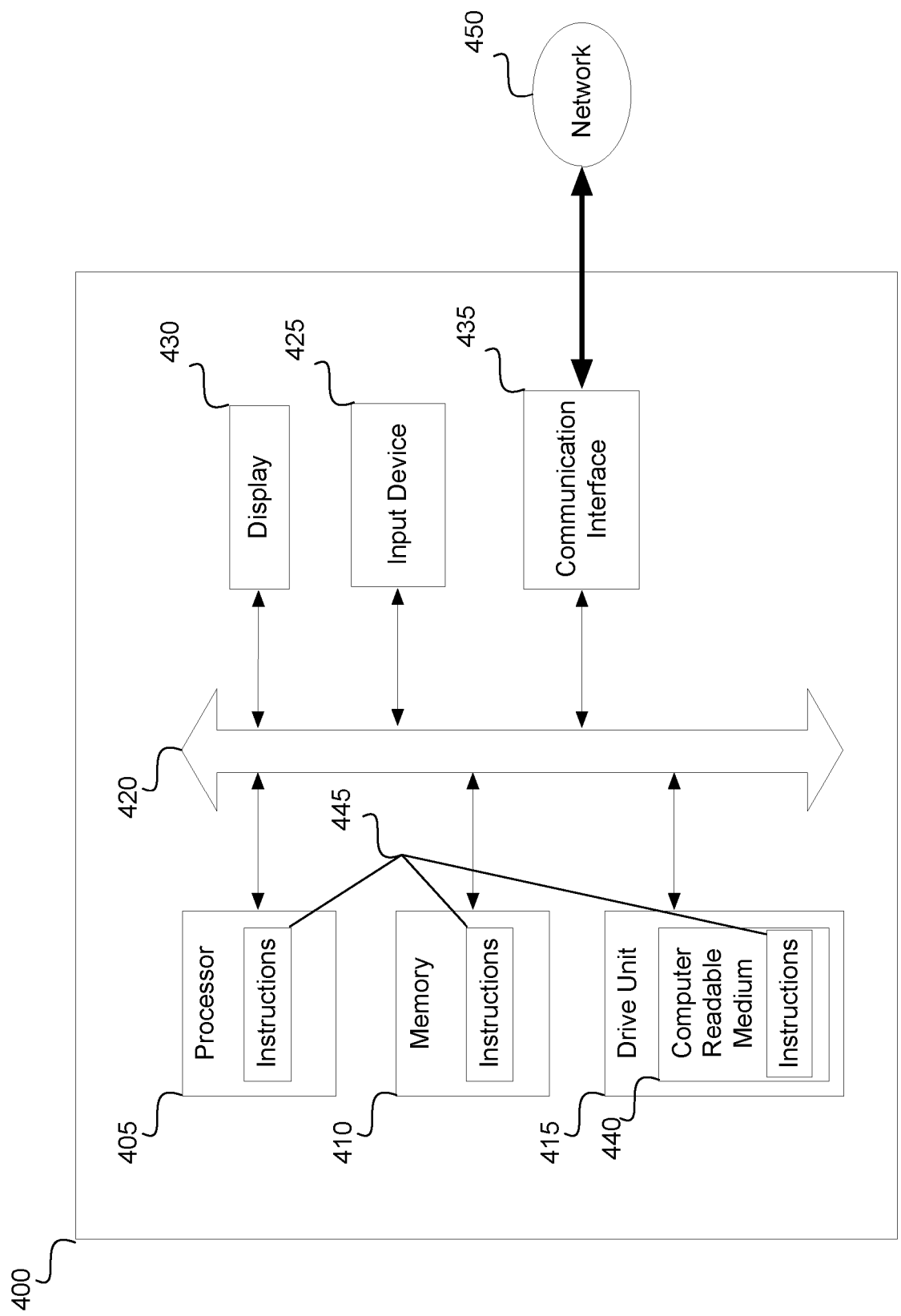
FIG. 4 illustrates an exemplary computer system that may form part of or implement the systems described in the figures or in the following paragraphs.

FIG. 4 illustrates a computer system 400 that may form part of or implement the systems, environments, devices, etc., described above. The computer system 400 may include a set of instructions 445 that the processor 405 may execute to cause the computer system 400 to perform any of the operations described above. The computer system 400 may operate as a stand-alone device or may be connected, e.g., using a network, to other computer systems or peripheral devices.

In a networked deployment, the computer system 400 may operate in the capacity of a server or as a client computer in a server-client network environment, or as a peer computer system in a peer-to-peer (or distributed) environment. The computer system 400 may also be implemented as or incorporated into various devices, such as a personal computer or a mobile device, capable of executing instructions 445 (sequential or otherwise) causing a device to perform one or more actions. Further, each of the systems described may include a collection of subsystems that individually or jointly execute a set, or multiple sets, of instructions to perform one or more computer operations.

The computer system 400 may include one or more memory devices 410 communicatively coupled to a bus 420 for communicating information. In addition, code operable to cause the computer system to perform operations described above may be stored in the memory 410. The memory 410 may be a random-access memory, read-only memory, programmable memory, hard disk drive or any other type of memory or storage device.

The computer system 400 may include a display 430, such as a liquid crystal display (LCD), a cathode ray tube (CRT), or any other display suitable for conveying information. The display 430 may act as an interface for the user to see processing results produced by processor 405.

Additionally, the computer system 400 may include an input device 425, such as a keyboard or mouse or touchscreen, configured to allow a user to interact with components of system 400.

The computer system 400 may also include a disk or optical drive unit 415. The drive unit 415 may include a computer-readable medium 440 in which the instructions 445 may be stored. The instructions 445 may reside completely, or at least partially, within the memory 410 and/or within the processor 405 during execution by the computer system 400. The memory 410 and the processor 405 also may include computer-readable media as discussed above.

The computer system 400 may include a communication interface 435 to support communications via a network 450. The network 450 may include wired networks, wireless networks, or combinations thereof. The communication interface 435 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A system for processing digital transactions comprising:
   an input/output (I/O) interface for receiving uncategorized digital transactions from one or more source systems and for communicating categorized digital transactions to one or more target systems;
   a processor in communication with the I/O interface; and
   non-transitory computer readable media in communication with the processor that stores instruction code, which when executed by the processor, causes the processor to:
   a) receive, from one or more source systems, a plurality of uncategorized digital transactions;
   b) prioritize the uncategorized digital transactions according to a key performance indicator (KPI) of each uncategorized digital transaction;
   c) communicate a subset of the prioritized uncategorized digital transactions to a labeling system configured to apply a category label to each digital transaction;
   d) receive, from the labeling system, a subset of categorized digital transactions corresponding to the subset of the prioritized uncategorized digital transactions;
   e) apply a category label and a label confidence value to each transaction of a remaining set of uncategorized digital transactions based on the subset of categorized digital transactions, wherein the label confidence value is indicative of a confidence that a given label was correctly applied to a given transaction, wherein in applying the category label and a label confidence value, the instruction code causes the processor to:
   determine one or more topics associated with the remaining set of uncategorized digital transactions;
   cluster each uncategorized digital transaction as belonging to one or more of the one or more topics;
   sort the clusters of transactions according to a total KPI represented by each cluster;
   select a subset of N clusters representing a highest KPI;
   for each cluster of the subset, sort transactions of the cluster according to the KPI of the transaction;

select a subset of M transactions having a highest KPI; and apply the category label to the subset of M transactions;

f) for each categorized digital transaction having a label confidence value at or above a predetermined threshold, communicate the categorized digital transaction to a target system; and g) for each remaining transaction, consider the transaction as an uncategorized digital transaction and repeat steps (b)-(g).

2. The system according to claim 1, wherein the total KPI represented by each cluster corresponds to the sum of KPIs associated with each uncategorized digital transaction belonging to the cluster.

3. The system according to claim 1, wherein in determining one or more topics, the instruction code causes the processor to:

generate a corpus of terms associated with the uncategorized digital transaction; and process the corpus of terms through a latent Dirichet allocation (LDA) algorithm to determine the one or more topics.

4. The system according to claim 3, wherein in clustering each uncategorized digital transaction as belonging to one or more of the one or more topics, the instruction code causes the processor to:

associate each uncategorized digital transaction with one or more clusters via hierarchical density based clustering (H-DBSCAN).

5. The system according to claim 1, wherein in applying a category label and a label confidence value to each transaction of a remaining set of uncategorized digital transactions, the instruction code causes the processor to:

generate a statistical decision tree based on the subset of categorized digital transactions; and process each remaining transaction through the decision tree to obtain a category label and confidence value associated with the category label.

6. The system according to claim 1, wherein the uncategorized digital transactions correspond to line items in a financial invoice.

7. The system according to claim 1, wherein in applying a category label and a label confidence value to each transaction of the remaining set of uncategorized digital transactions, the instruction code causes the processor to:

determine a subset of P transactions being outside of the subset of N clusters; and select a subset of Q transactions of a subset of P transactions having a highest KPI.

8. The system according to claim 1, wherein the processor is configured to train a machine learning model based on the selected subset of M transactions and a subset of Q transactions and the applied category labels.

9. A non-transitory computer readable media that stores instruction code for processing digital transactions, the instruction code being executable by a machine for causing the machine to:

a) receive, from one or more source systems, a plurality of uncategorized digital transactions;

b) prioritize the uncategorized digital transactions according to a key performance indicator (KPI) of each uncategorized digital transaction, by:

determining one or more topics associated with the uncategorized digital transactions;

clustering each uncategorized digital transaction as belonging to one or more of the one or more topics;

sorting the clusters of transactions according to a total KPI represented by each cluster;

selecting a subset of N clusters representing a highest KPI;

for each cluster of the subset, sorting transactions of the cluster according to the KPI of the transaction;

selecting a subset of M transactions having a highest KPI as the prioritized uncategorized digital transactions to be communicated to the target system; and communicating a subset of M transactions having a highest KPI to the labeling system;

c) communicate a subset of the prioritized uncategorized digital transactions to a labeling system configured to apply a category label to each digital transaction;

d) receive, from the labeling system, a subset of categorized digital transactions corresponding to the subset of the prioritized uncategorized digital transactions;

e) apply a category label and a label confidence value to each transaction of a remaining set of uncategorized digital transactions based on the subset of categorized digital transactions, wherein the label confidence value is indicative of a confidence that a given label was correctly applied to a given transaction;

f) for each categorized digital transaction having a label confidence value at or above a predetermined threshold, communicate the categorized digital transaction to a target system; and g) for each remaining transaction, consider the transaction as an uncategorized digital transaction and repeat steps (b)-(g).

10. The non-transitory computer readable media according to claim 9, wherein the total KPI represented by each cluster corresponds to the sum of KPIs associated with each uncategorized digital transaction belonging to the cluster.

11. The non-transitory computer readable media according to claim 9, wherein in determining one or more topics, the instruction code causes the machine to:

generate a corpus of terms associated with the uncategorized digital transaction; and process the corpus of terms through a latent dialect allocation (LDA) algorithm to determine the one or more topics.

12. The non-transitory computer readable media according to claim 11, wherein in clustering each uncategorized digital transaction as belonging to one or more of the one or more topics, the instruction code causes the machine to:

associate each uncategorized digital transaction with one or more clusters via hierarchical density based clustering (H-DBSCAN).

13. A method for processing digital transactions comprising:

a) receiving, from one or more source systems, a plurality of uncategorized digital transactions;

b) prioritizing the uncategorized digital transactions according to a key performance indicator (KPI) of each uncategorized digital transaction by:

determining one or more topics associated with the uncategorized digital transactions;

clustering each uncategorized digital transaction as belonging to one or more of the one or more topics;

sorting the clusters of transactions according to a total KPI represented by each cluster;

selecting a subset of N clusters representing a highest KPI;

for each cluster of the subset, sort transactions of the cluster according to the KPI of the transaction;

selecting a subset of M transactions having a highest KPI as the prioritized uncategorized digital transactions to be communicated to the target system; and communicating a subset of M transactions having a highest KPI to the labeling system;

c) communicating a subset of the prioritized uncategorized digital transactions to a labeling system configured to apply a category label to each digital transaction;

d) receiving, from the labeling system, a subset of categorized digital transactions corresponding to the subset of the prioritized uncategorized digital transactions;

e) applying a category label and a label confidence value to each transaction of a remaining set of uncategorized digital transactions based on the subset of categorized digital transactions, wherein the label confidence value is indicative of a confidence that a given label was correctly applied to a given transaction;

f) for each categorized digital transaction having a label confidence value at or above a predetermined threshold, communicating the categorized digital transaction to a target system; and g) for each remaining transaction, considering the transaction as an uncategorized digital transaction and repeating steps (b)-(g).

14. The method according to claim 13, wherein the total KPI represented by each cluster corresponds to the sum of KPIs associated with each uncategorized digital transaction belonging to the cluster.

15. The method according to claim 13, wherein determining one or more topics further comprises:

generating a corpus of terms associated with the uncategorized digital transaction; and processing the corpus of terms through a latent Dirichlet allocation (LDA) algorithm to determine the one or more topics.

16. The method according to claim 15, wherein clustering each uncategorized digital transaction as belonging to one or more of the one or more topics further comprises:

associating each uncategorized digital transaction with one or more clusters via hierarchical density based clustering (H-DBSCAN).

17. The method according to claim 13, wherein applying a category label and a label confidence value to each transaction of a remaining set of uncategorized digital transactions further comprises:

generating a statistical decision tree based on the subset of categorized digital transactions; and processing each remaining transaction through the decision tree to obtain a category label and confidence value associated with the category label.

* * * * *